May 12, 1953  A. M. CANDY  2,638,525
WELDING STUD AND METHOD OF ARC WELDING
Filed Oct. 30, 1945
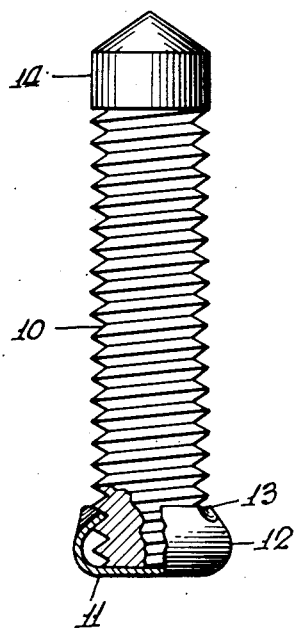
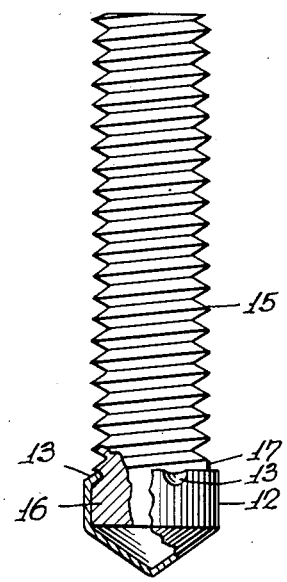
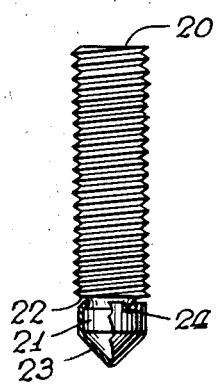
INVENTOR
Albert M. Candy
BY
Dean Fairbank & Hirsch
ATTORNEYS
45-268

Patented May 12, 1953

2,638,525

UNITED STATES PATENT OFFICE 2,638,525

WELDING STUD AND METHOD OF ARC WELDING

Albert M. Candy, La Grange, Ill., assignor, by mesne assignments, to National Cylinder Gas Company, Chicago, Ill., a corporation of Delaware Application October 30, 1945, Serial No. 625,541

5 Claims. (Cl. 219—10)

This invention is an improvement in studs or stud like members adapted to be butt-welded to the surface of a metal plate or other metallic member and by the action of an electric circuit and the formation of an electric arc between the stud and said member.

In the usual procedure for such butt-welding the stud is brought into contact with the plate, the electric circuit is passed from one to the other, and the stud is then spaced slightly from the plate to form an arc. When the end of the stud is partially melted and a pool or puddle of molten metal is formed on the plate, the stud end is forced into the pool, the current is interrupted, and the molten metal cools to leave the stud and plate firmly bonded together.

It is common practice to provide a flux, which is usually a powder or shredded or granulated particles, which may be applied to or placed on the member at the place where the stud is to be affixed. Loose fluxing powder is difficult to hold in place if the plate be in a position other than horizontal. It is not a good conductor for electricity, and care is required in using the proper amount and insuring the proper placing of the fluxing powder.

It has been proposed in Patent 2,268,416, Reissue 22,411, to use a special stud which has a chamber or cavity in the end; to place the flux in such chamber; and to hold the flux therein by a metal cover plate which is retained in place on the stud and beneath a bead at the outer end of the wall around the cavity. This requires a number of machining and other operations and materially increases the cost of the stud.

The main objects of the present invention are to avoid the objections incidental to the use of a fluxing powder, to avoid the necessity of special machining of the stud, and to provide a stud that may be easily butt-welded to a plate or other member in any position and with the desired fluxing action, but without the use of a fluxing powder.

In carrying out my invention, I provide the stud with an aluminum cap which may be easily formed at low cost, which may be readily applied to the stud by hand or machine, which contacts the plate and serves as a conductor of current, which readily and quickly melts to break the circuit and form an arc, which oxidizes and protects the metal of the stud and the plate from oxidizing, and which acts as a flux for scavenging the weld.

In the accompanying drawings I have shown three embodiments of my invention. In the drawings:

Fig. 1 is the side elevation of one form of stud, partly broken away at one end, Fig. 2 is a side elevation of another form, also partly broken away, and Fig. 3 is a similar view of a third form.

In my improved construction, as shown in Fig. 1, there is provided a stud 10, usually of iron and threaded to receive a nut or other similarly threaded member, which is to be connected to the plate or other part by said stud. The threads may extend the full length of the stud so that the stud may be made by cutting a threaded rod into sections of the desired length; or there may be an unthreaded head 14 at one end. At the end of the stud which is to be welded, there is provided an aluminum cap 11, which has a peripheral flange 12, a portion of which may be crimped inwardly, or have portions 13 bent in to engage between threads of the stud. It may be screwed onto the stud by hand or machine, or it may be slipped onto the stud and portions of the peripheral wall, preferably at the edge, forced in between the threads by any suitable tool. The bottom wall of the cap is shown as substantially flat and in use engages the plate and spaces the body of the stud therefrom. This end wall may be convex or slightly conical to further space the end of the stud from the plate when the current flow is started.

In the form shown in Fig. 2, the threads on the stud 15 do not extend all the way to the end which is to be butt-welded so that there is left a head 16, which has a groove 17 formed therein. This groove may be that at the end of the last thread. In this case a slight crimping or bending of the edge portion of the flange 12 of the cap or spaced portions of said flange, is effected after the cap has been applied. In this form the cap is shown as having a conical end wall for contacting the plate or other element to which the stud is to be butt-welded and for spacing the body of the stud from the plate, to the distance required for forming the desired arc.

Although I have shown the cap as held on the end of the stud by portions engaging in helical or non-helical grooves, it will be apparent that the cap may be retained in various other ways, such for instance as by the use of a very small amount of some suitable adhesive, because the retention of the cap on the stud is essential only for the placing of the stud in the gun and the bringing of it into position for welding. The peripheral wall of the cap need not be continuous, but may be formed of spaced flanges bent up from the disc forming the end wall of the cap.

In some cases, and particularly where the stud is to be extended through a hole in a wood planking or sheathing, and it is desired to have such hole not substantially larger than the diameter of the stud, the stud end may be slightly reduced so that it may carry a cap not substantially larger in outside diameter than the body of the stud. In Fig. 3, I have shown a threaded stud 20 having an end portion 21 slightly smaller in diameter than the body of the stud, and with a groove 22 at the upper end. The cap 23 encircles this portion of reduced diameter and has its edge 24 flanged or crimped into the groove.

My improved stud is used in the usual manner, and may be applied by any suitable type of stud welding apparatus. After the cap of the stud has been brought into contact with the plate or other metal parts, and current is passed therethrough, the stud may, if necessary, be pulled slightly away from the plate, and the arc is formed. The cap quickly melts, as it has a lower melting point than the iron, and it readily and quickly oxidizes. In oxidizing it acts as a flux to prevent the oxidation of the molten or highly heated parts of the plate and stud.

The cap may be stamped from sheet aluminum, which may be approximately .015" thick, and the amount of aluminum required for effecting the desired fluxing action may be varied by varying the length of the peripheral wall or the flange of the cap or by selecting the proper thickness of the sheet aluminum from which the cap is stamped.

An important advantage resulting from the use of aluminum caps on the studs is that they prevent any tendency of the stud to freeze prematurely to the plate, which premature freezing usually results in a poor weld. The aluminum has a much lower melting point than the iron or steel and will be converted to a molten state before the plate or stud has melted or softened. As the cap extends across the end of the stud, its melting may establish the arc gap between the end of the stud and the plate or other member. Such gap is dependent upon the thickness of the wall of the cap, a spacing of the end wall from the end of the stud, or the extent to which the end wall of the cap departs from a transverse plane. Therefore, by the use of my improved stud in some cases it may not be necessary to provide mechanism for pulling the stud away from the plate in order to form the arc, but if such mechanism be employed, it may be of a simpler and less expensive design.

Having thus described my invention, what I claim as new and desire to secure by Letters Patent is:

1. A threaded iron stud adapted to be arc-welded to a metal part, said stud having telescoped over one end thereof and in electrical contact therewith an aluminum cap serving to space the terminal surface of said one end of the stud from said metal part prior to the melting of said aluminum cap in the arc-welding process, whereby the electric current used in said welding is passed through said cap during the initial step of said welding and the cap is thereby melted to form a flux protecting the molten iron of said stud and said part from being oxidized.

2. Method of arc-welding a stud to a plate, which comprises placing a ferrous stud provided with an aluminum element carried by and extending beyond the terminal surface of the end of the stud to be welded in position against a metal part, completing an electrical circuit between said stud and said part through said aluminum element to form an arc upon melting of said aluminum element, the thickness and spacing of said element with respect to said stud and the amount of aluminum constituting said element being so selected and correlated as to position said stud initially at the proper distance from said part to form a welding arc and upon being melted, forms a gap for the arc and provides a flux to protect molten metal formed by said arc from oxidation, and forcing the end of said stud into contact with said part thereby to interrupt said arc and form a weld.

3. A threaded iron stud adapted to be arc welded to a metal part, and having a threaded body portion with an end of no larger diameter than the body of the stud, and an aluminum cap secured to and enclosing the end of the stud with the bottom of the cap spaced from the surface of the stud, whereby in welding the stud to an iron part the cap spaces the stud from said metal part and conducts current between the stud and said part until melted by said current, and upon melting effects fluxing action during welding.

4. A ferrous stud adapted to be welded at one end to a metal part and having at said one end an aluminum element extending therebeyond to space the same from said metal part, said aluminum element having a peripheral portion engaging the outer surface of said stud at said one end and a central portion overlying said one end of said stud.

5. Method of arc-welding a stud to a plate, which comprises placing a ferrous stud provided with an aluminum cap carried by and enclosing and extending beyond the terminal surface of the end of the stud to be welded in position against a metal part, completing an electrical circuit between said stud and said part through said aluminum cap to form an arc upon melting of said aluminum cap, the thickness and spacing of said cap with respect to said end of said stud and the amount of aluminum constituting said cap being so selected and correlated as to position said stud initially at the proper distance from said part to form a welding arc and upon being melted forming a gap for the arc and providing a flux to protect molten metal formed by said arc from oxidation, and forcing said end of said stud into contact with said part thereby to interrupt said arc and form a weld.

ALBERT M. CANDY.

References Cited in the file of this patent

UNITED STATES PATENTS

| Number | Name | Date |
| --- | --- | --- |
| Re. 22,411 | Nelson | Dec. 21, 1943 |
| 412,599 | Coffin | Oct. 8, 1889 |
| 829,412 | Marggraff | Aug. 28, 1906 |
| 1,152,960 | Moloney | Sept. 7, 1915 |
| 1,221,506 | Moench | Apr. 3, 1917 |
| 1,231,749 | Kuhn | July 3, 1917 |
| 1,767,184 | Marbach | June 24, 1930 |
| 2,057,670 | Crecca et al. | Oct. 20, 1936 |
| 2,268,416 | Nelson | Dec. 30, 1941 |
| 2,356,583 | Hampton | Aug. 22, 1944 |
| 2,384,403 | Somers | Sept. 5, 1945 |
| 2,402,659 | Nelson | June 25, 1946 |
| 2,462,882 | Martin | Mar. 1, 1949 |
| 2,467,379 | Graham | Apr. 19, 1949 |

FOREIGN PATENTS

| Number | Country | Date |
| --- | --- | --- |
| 497,133 | Great Britain | Dec. 13, 1938 |